US00RE34114E

United States Patent [19]

Lindner

[11] E Patent Number: Re. 34,114

[45] Reissued Date of Patent: Oct. 27, 1992

[54] POSITIVE DISPLACEMENT PISTON PUMP

[75] Inventor: Georg H. Lindner, Vlissingen, Netherlands

[73] Assignee: Atochem North America, Inc.

[21] Appl. No.: 486,702

[22] Filed: Feb. 28, 1990

Related U.S. Patent Documents

Reissue of:

[64] Patent No.: 4,575,317
Issued: Mar. 11, 1986
Appl. No.: 749,066
Filed: Jun. 26, 1985

[51] Int. Cl.[5] ..... F04B 7/06

[52] U.S. Cl. ..... 412/500; 92/13

[58] Field of Search ..... 417/500, 492, 274, 275; 92/13, 60.5; 123/45 R, 45 A

[56] References Cited

U.S. PATENT DOCUMENTS

| | | | |
|---|---|---|---|
| 2,896,459 | 7/1959 | Jemison et al. | 417/500 X |
| 2,964,234 | 12/1960 | Loomis, III | 74/44 X |
| 3,168,872 | 2/1965 | Pinkerton | 417/500 X |
| 3,257,953 | 6/1966 | Pinkerton | 417/500 |
| 4,008,003 | 2/1977 | Pinkerton | 417/492 |
| 4,575,317 | 3/1986 | Linder | 417/500 |

*Primary Examiner*—Leonard E. Smith
*Attorney, Agent, or Firm*—Stanley A. Marcus; Robert B. Henn

[57] ABSTRACT

A positive displacement piston pump includes a cylinder having a working end, an inlet port, an outlet port and a working chamber bounded by the outlet port and the working end; a piston rotatably and reciprocably movable in the cylinder between a retracted position and an extended position, the piston including a free end having a recessed section alternately in fluid communication with the inlet port and the outlet port; a drive motor rotatably and reciprocably driving the piston in the cylinder; a yoke and ball and socket joint pivotally connecting the piston to the drive motor; a base having an upper surface with an elongated slot below the pivot point of the piston and an arcuate slot adjacent the opposite end of the cylinder; and first and second pivot pins secured to a swivel plate which is, in turn, secured to the cylinder through a vertical column, whereby the recessed section is positioned entirely in the working chamber when the piston is at the end of its pressure stroke, regardless of the angle between the piston and the drive motor.

6 Claims, 4 Drawing Sheets

POSITIVE DISPLACEMENT PISTON PUMP

Matter enclosed in heavy brackets [ ] appears in the original patent but forms no part of this reissue specification; matter printed in italics indicates the additions made by reissue.

BACKGROUND OF THE INVENTION

This invention relates generally to positive displacement piston pumps, and more particularly, is directed to a positive displacement piston pump that prevents the entrapment of air during operation.

Positive displacement piston pumps, to which the present invention is directed, are well known, for example, from U.S. Pat. Nos. 3,168,872; 3,257,953; and 4,008,003. Such pumps include a cylinder having an inlet port and a diametrically opposite outlet port. A piston is rotatably and reciprocably driven in the cylinder and includes a recessed section at the free end thereof, which functions as a duct between the inlet port and the outlet port. During rotation of the piston, the recessed section is alternately in fluid communication with the inlet port and the outlet port, whereby fluid is pumped from the inlet port to the outlet port. During rotation, the piston also reciprocates within the cylinder between a retracted position and an extended position, the latter corresponding to the end of the pressure stroke.

The piston is secured to a drive shaft of a motor by means of a pivotal coupling. Specifically, a yoke is keyed to the drive shaft of the motor and includes a socket accessible through a bore of the yoke. A transverse arm is secured to the driven end of the piston and has a ball formed at the free end thereof which mates with the socket to form a universal ball and socket joint. In this regard, the piston and cylinder can be pivoted with respect to the axis or center line of the drive shaft of the motor.

The angle between the piston and the drive shaft determines the pump stroke and the direction of pumping. When the axis of the piston is coincident with the center line of the drive shaft, the piston does not reciprocate in the cylinder during rotation of the drive shaft. Under such circumstances, no pumping action takes place. When the piston is pivoted with respect to the drive shaft in a first direction, reciprocation occurs during rotation. The amount of reciprocation depends on the angle between the piston and drive shaft. As the angle is increased, the piston stroke is increased and the flow rate is increased between the inlet port and the outlet port. When the piston is pivoted with respect to the drive shaft in the opposite direction, the flow is reversed, so that the former inlet port and outlet port become the outlet port and inlet port, respectively. Again, the amount of reciprocation depends on the angle between the piston and drive shaft.

However, a problem occurs with use of such pumps, particularly when used for the precision metering of fluids requiring low flow rates, for example, on the order of a few milliliters per minute or less. Specifically, gases, such as air, hydrogen, carbon dioxide and the like which are carried in the fluid, are often released in the cylinder as a result of agitation of the fluid during the puxping operation or as a result of pressure and temperature changes. For example, some fluids respond to agitation and/or pressure and temperature changes by chemically separating into liquid and gas fractions, while other fluids simply vaporize, physically changing from liquid to gaseous form. The problem that results is that the gases form bubbles which become trapped in the pumping head of the cylinder, thereby spoiling the metering precision of the pump, and in some situations, blocking flow completely. Generally, the gas bubbles become trapped between the recessed section of the piston and the inner wall of the cylinder.

Specifically, when the piston is pivoted with respect to the drive shaft to its maximum extent, that is, when the pump is operating at maximum pump stroke, the piston reciprocates over a maximum distance between its retracted position and extended position such that the free end of the piston is in close proximity to the end wall of the cylinder in the extended position, that is, at the end of its pump stroke. In this position, the top or proximal end of the recessed section is at or below the outlet port, and is positioned in the working chamber of the cylinder which is bounded by the outlet port and the end wall. Any bubbles that are formed thereby exit through the outlet port.

However, when the pump is not operating at full capacity, that is, when the piston is pivoted to less than its maximum extent, the piston is caused to reciprocate over a lesser distance between its retracted position and extended position. As a result, the top of the recessed section remains above the outlet port at all times during reciprocation of the piston. Gas bubbles formed between the recessed section and the inner wall of the cylinder thereby during the pumping operation, adversely affecting the same. It will be appreciated that the smaller the piston stroke, the more gas that will be trapped by the recessed section, thereby increasing the ratio of volume of entrapped gas to pump displacement. In other words, the pump becomes gas sensitive.

OBJECTS AND SUMMARY OF THE INVENTION

Accordingly, it is an object of the present invention to provide a positive displacement piston pump that prevents the entrapment of gas bubbles therein during operation.

It is another object of the present invention to provide a positive displacement piston pump that is relatively insensitive to gas entry at less than maximum operating capacity.

It is still another object of the present invention to provide a positive displacement piston pump in which the piston is always moved in close proximity to the working end wall of the cylinder at the end of its pressure stroke, regardless of the angle between the piston and drive shaft of the drive motor.

It is yet another object of the present invention to provide a positive displacement piston pump that is simple and economical to manufacture and use.

In accordance with an aspect of the present invention, a pump comprises a cylinder including a working end, an inlet port, an outlet port and a working chamber bounded by the outlet port and the working end; a piston rotatably and reciprocably movable in the cylinder between a retracted position and an extended position, the piston including a free end having a recessed section alternately in fluid communication with the inlet port and the outlet port; means for pivotally connecting the piston to drive means; and means for ensuring that the recessed section is positioned entirely in the working chamber when the piston is in the extended position, regardless of the angle between the piston and the means for driving.

More particularly, the means for ensuring includes base means having an arcuate slot with a radius of curvature generally transverse to the piston and at least one elongated slot extending in a direction generally transverse to the arcuate slot, and pin means for guiding the cylinder in the arcuate slot and the at least one elongated slot during pivotal movement of the piston with respect to the means for driving.

The above, and other, objects features and advantages of the present invention will become readily apparent from the following detailed description of the invention which is to be read in connection with the accompany drawings.

DETAILED DESCRIPTION OF THE PREFERRED EMBODIMENTS

Figure 1:
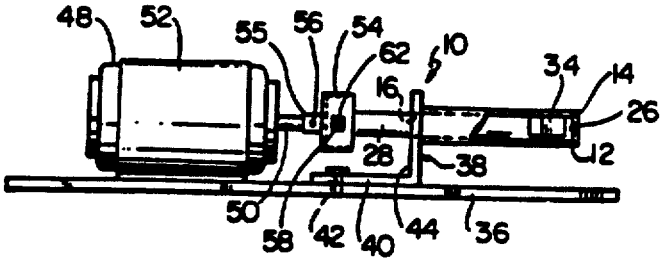
FIG. 1 is a side elevational view, partially in cross section, of a conventional positive displacement piston pump.
Figure 2:
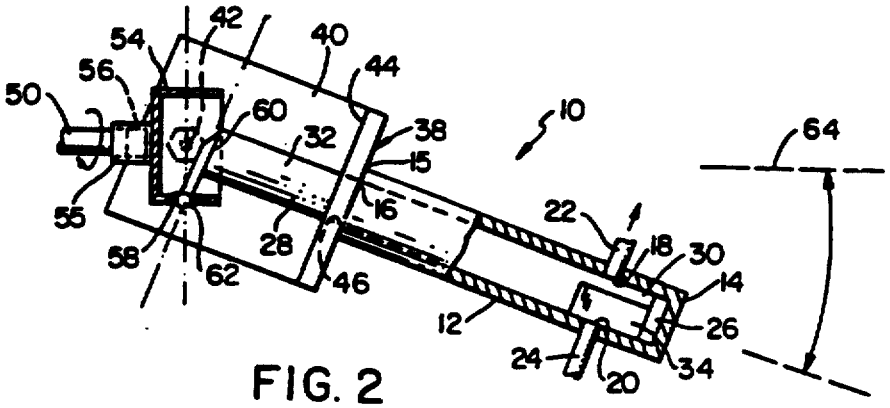
FIG. 2 is a top plan view, partially in cross-section, of the positive displacement piston pump of FIG. 1, with the piston pivoted with respect to the drive shaft of the motor.

Referring to the drawings in detail, and initially to FIGS. 1 and 2 thereof, a conventional positive displacement piston pump 10, of the type described in U.S. Pat. No. 3,168,872, includes a hollow cylinder 12 having a closed working end 14 and an opposite end 15 having a bore 16 therein. Diametrically opposite ports 18 and 20 are formed in cylinder 12, adjacent working end 14. As will be clear from the description hereinafter, each port 18 and 20 can function as either an inlet port or an outlet port. Thus, when port 18 functions as an inlet port, port 20 functions as an outlet port, and vice versa. Suitable tubing 22 and 24 may be coupled with ports 18 and 20, respectively, as part of the circuit or system for fluid to be pumped. A working chamber 26 is formed in cylinder 12, being bounded by working end 14 and ports 18 and 20, and is in fluid communication with ports 18 and 20.

A piston 28 is rotatably and reciprocably positioned in cylinder 12 through bore 16, and includes a free end 30 and a driven end 32. Free end 30 is formed with a flat, recessed section 34 which is alternately in fluid communication with ports 18 and 20 as piston 28 rotates within cylinder 12. Thus, recessed section 34 functions as a duct between ports 18 and 20, alternately opening and closing each port 18 and 20 in sequence. Recessed section 34, together with that portion of working chamber 26 at the head of piston 28, cooperates in forming the cylinder pumping chamber, whereby fluid is pumped between ports 18 and 20.

As shown, cylinder 12 and piston 28 are mounted on a base 36 through an L-shaped bracket 38, one leg 40 of which rests on base 36 and is coupled thereto by means of a pivot pin 42. The opposite end 15 of cylinder 12 is secured to the outer face of the other leg 44 of bracket 38, and leg 44 is formed with a bore 46 through which piston 28 extends into the interior of cylinder 12.

As shown in FIG. 1, a drive motor 48 having an output drive shaft 50 is mounted on base 36 by means of a motor bracket 52. A collar or yoke 54 having a reduced boss 55 is keyed to drive shaft 50 by any suitable means, such as a pin 56 extending through reduced boss 55 and drive shaft 50. Yoke 54 is provided with a socket 58. A laterally projecting or transverse arm 60 in secured to driven end 32 of piston 28, and has a ball or spherical bearing 62 secured to the free end thereof. Ball 62 is received in socket 58 to fdrm a universal ball and socket joint. With this arrangement, piston 28 is rotatably driven by drive shaft 50, whereby fluid is pumped between ports 18 and 20. At the same time, piston 28 is pivotally connected to drive shaft 50 through the aforementioned universal ball and socket joint, as clearly shown in FIG. 2.

When piston 28 is disposed in a substantially coaxial relationship with respect to drive shaft 50, piston 28 will rotate within cylinder 28. However, in such coaxial position, piston 28 will have no stroke, and will therefore not reciprocate upon energization of motor 48. Under such circumstances, no pumping action takes place.

On the other hand, as shown in FIG. 2, when cylinder 12 is pivoted about pivot pin 42, which is in alignment with the vertically extending axis of yoke 54, piston 28 will be pivoted with respect to the axis or center line 64 of drive shaft 50. Because piston 28 is connected to yoke 54 through transverse arm 60 and the universal ball and socket joint, piston 28 will reciprocate in cylinder 12 between a retracted position and an extended position, during rotation thereof. The combined rotational and reciprocable movement of piston 28 in cylinder 12 will cause the fluid to be pumped out from working chamber 26 through port 18. In this connection, port 20 will function as an inlet port. Pivoting of cylinder 12 in the opposite direction of center line 64, will reverse fluid flow. The magnitude of pivotal movement of cylinder 12 will determine the amplitude of the piston stroke, and consequently, the rate of fluid flow, that is, the greater the angle, the greater the piston stroke and consequent fluid flow.

As previously discussed, however, gases, such as air, hydrogen, carbon dioxide and the like which are carried in the fluid, are often released in the pumping chamber of cylinder 12 as a result of agitation of the fluid during the pumping operation or as a result of pressure and temperature changes. As a result, the released gases form bubbles which become trapped in the pumping chamber of cylinder 12, thereby spoiling the metering precision of pump 10, and in some situations, blocking flow completely. Generally, the gas bubbles become trapped between recessed section 34 of piston 28 and the inner wall of cylinder 12.

Figure 3A:
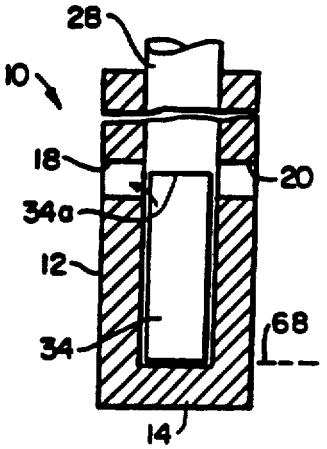
FIGS. 3A-3C are partial cross-sectional views of a portion of a conventional positive displacement piston pump, showing operation at maximum capacity.
Figure 3B:
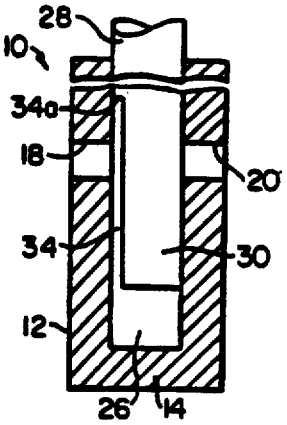
Figure 3C:
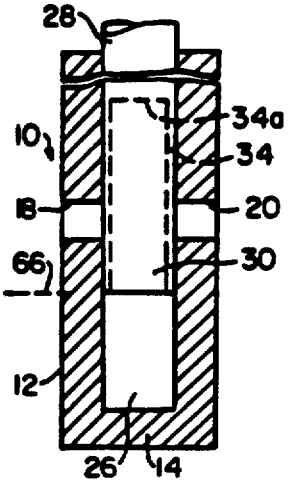

Specifically, when piston 28 is pivoted with respect to center line 64 of drive shaft 50 to its maximum extent, that is, when pump 10 is operating at maximum pump stroke, as shown in FIGS. 3A-3C, piston 28 reciprocates over a maximum distance between its retracted position 66 and its extended position 68 at which free end 30 of piston 28 is in close proximity to the end wall or working end 14 of cylinder 12 in the extended position 68. In this position, the top or proximal end 34a of recessed section 34 is at or below the outlet port, that is, within the working chamber of cylinder 12 which is bounded by the outlet port and working end 14. Any bubbles that are formed thereby exit through the outlet port.

Figure 4A:
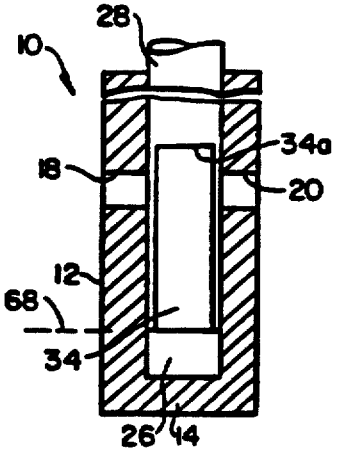
FIGS. 4A-4C are partial cross-sectional views of a portion of a conventional positive displacement piston pump, showing operation at less than maximum capacity.
Figure 4B:
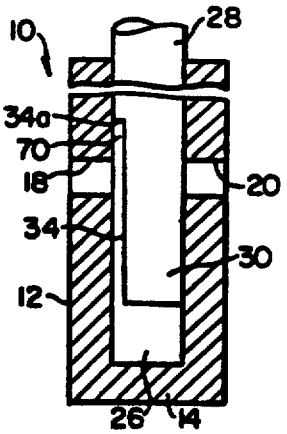
Figure 4C:
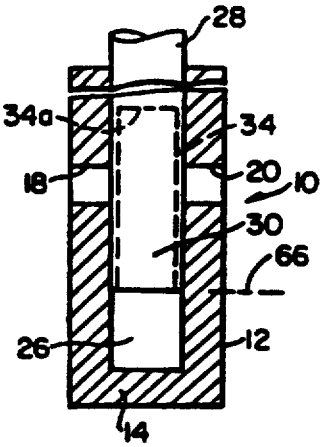

However, when pump 10 is not operating at full capacity, for example, at 25% of maximum capacity, that is, when piston 28 is pivoted to less than its maximum extent, as shown in FIGS. 4A-4C, piston 28 is caused to reciprocate over a lesser distance between its retracted position 66 and extended position 68. As a result, the top 34a of recessed section 34 remains above the outlet port at all times during reciprocation of piston 28. Gas bubbles formed in a pocket 70 between recessed section 34 and the inner wall of cylinder 12, as shown in FIG. 4B, thereby remain during the pumping operation, adversely affecting the same. It will be appreciated that the smaller the piston stroke, the more gas that will be trapped by pocket 70, thereby increasing the ratio of volume of entrapped gas to pump displacement. In other words, the pump becomes gas sensitive.

Because of this problem, a pump operating at less than maximum capacity must have its flow rate changed several times. Entrapped gas will then flow out of the pump, restoring its set delivery rate. However, such capacity changes are bothersome and time consuming. When used, for example, for pumping fluid to coat bottles, such capacity changes cause excess usage of expensive coating chemicals or cause insufficient coating on the bottles.

Figure 5:
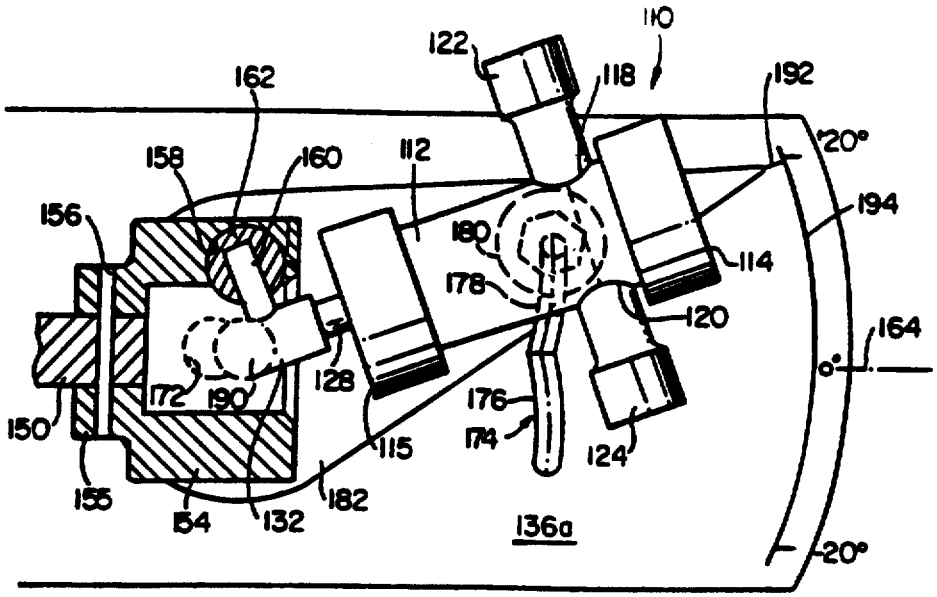
FIG. 5 is a top plan view, partially in cross-section, of a positive displacement piston pump according to a first embodiment of the present invention.
Figure 6:
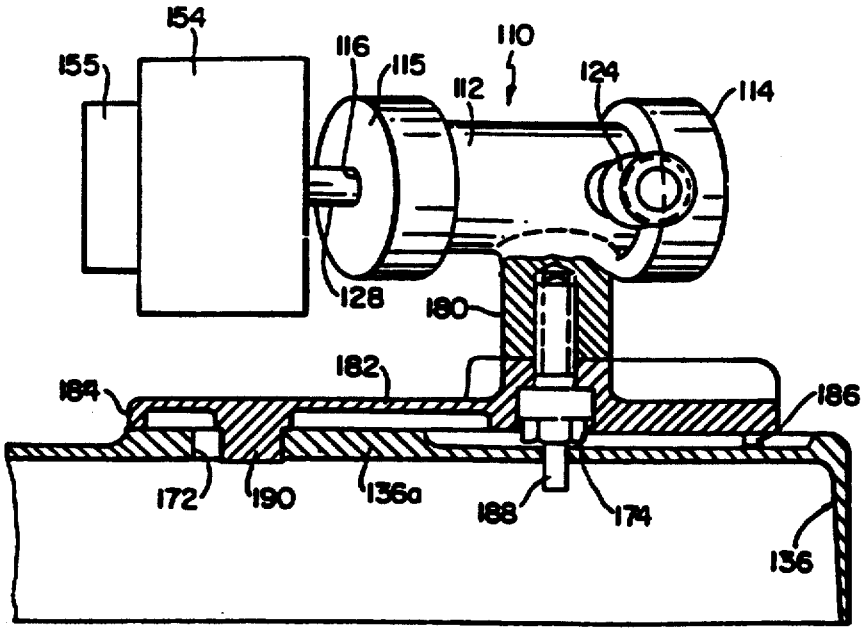
FIG. 6 is a side elevational view, partially in cross-section, of the positive displacement piston pump of FIG. 5.

Referring to FIGS. 5 and 6, a positive displacement piston pump 110 according to a first embodiment of the present invention will now be described, in which elements corresponding to those in the conventional positive displacement piston pump of FIGS. 1 and 2 are identified by the same reference numerals, augmented by 100. As shown, pump 110 includes a hollow cylinder 112 having a closed working end 114 and an opposite end 115 having a bore 116. Diametrically opposite ports 118 and 120 are formed in cylinder 112, adjacent working end 114. As with the conventional positive displacement piston pump 10, each port 118 and 120 can function as either an inlet port or an outlet port. Thus, when port 118 functions as an inlet port, port 120 functions as an outlet port, and vice versa. Suitable tubing 122 and 124 may be coupled with ports 118 and 120, respectively, as part of the circuit or system for fluid to be pumped. A working chamber (not shown) is formed in cylinder 112, is bounded by working end 114 and ports 118 and 120, is in fluid communication with ports 118 and 120, in an identical manner to working chamber 26 of the embodiment of FIGS. 1 and 2.

A piston 128 is rotatably and reciprocably positioned in cylinder 112 through bore 116, and includes a free end (not shown) and a driven end 132. The free end is formed with a flat, recessed section, identical to that shown in FIGS. 1 and 2, which is alternately in fluid communication with ports 118 and 120 as piston 128 rotates within cylinder 112. Thus, the recessed section functions as a duct between ports 118 and 120, alternately opening and closing each port 118 and 120 in sequence. The recessed section, together with that portion of working chamber at the head of piston 128, cooperates in forming the cylinder pumping chamber, whereby fluid is pumped between ports 118 and 120.

A collar or yoke 154 having a reduced boss 155 is keyed to a drive shaft 150 of a drive motor (not shown) by any suitable means, such as a pin 156, in a manner similar to that described with respe to the conventional positive displacement piston pump 10 of FIGS. 1 and 2. Yoke 154 is provided with a socket 158. A laterally projecting or transverse arm 160 is secured to driven end 132 of piston 128, and has a ball or spherical bearing 162 secured to the free end thereof. Ball 162 is received in socket 158 to form a universal ball and socket joint. With this arrangement, piston 128 is rotatably driven by drive shaft 150, whereby fluid is pumped between ports 118 and 120. At the same time, piston 128 is pivotally connected to drive shaft 150 through the aforementioned universal ball and socket joint, as clearly shown in FIG. 5.

Positive displacement piston pump 110 thus far described is conventional and is similar in structure and operation to conventional positive displacement piston pump 10 of FIGS. 1 and 2.

In accordance with the present invention, cylinder 112, and thereby piston 128, are pivotally mounted on base 136 such that the top or proximal end of the recessed section of piston 128 is positioned entirely within the working chamber of cylinder 112, which is bounded by working end 114 and ports 118 and 120, when piston is in its extended position, that is, at the end of its pressure stroke, regardless of the angle between piston 128 and center line 164 of drive shaft 150. As a result, in the extended position, regardless of the angle between piston 128 and drive shaft 150, no gas pocket 70 is formed between the recessed section of piston 128 and the inner wall of cylinder 112, whereby pump 110 is effectively gas insensitive.

This is accomplished by shifting the retracted position and extended position of piston 128, without changing the piston stroke. Specifically, the extended position is shifted to the position shown in FIG. 3A, regardless of the angle between piston 128 and center line 164. The retracted position will vary depending on this angle. This means that the pump stroke, that is, the total longitudinal movement of piston 128 within cylinder 112 between its extended position and retracted position, remains the same as in the conventional positive displacement piston pump 10 of FIGS. 1 and 2. As a result, the flow rate remains the same, while eliminating the problem of trapped gas.

As shown in FIGS. 5 and 6, upper surface 136a of base 136 is formed with a linearly arranged, elongated slot 172 which is elongated in the direction of center line 164 and which is positioned below yoke 154. An arcuate slot 174 is also formed in upper surface 136a of base 136. Specifically, arcuate slot 174 is formed by two arcuate slot sections 176 and 178, which are joined at respective ends thereof and which are symmetrically arranged about center line 164. As a general approximation, the center of arcuate slot section 178 is taken at the center of ball 162 in the position shown in FIG. 5. In like manner, the center of arcuate slot section 176 is taken at the center of ball 162 when the latter is positioned diametrically opposite to the position shown in FIG. 5. As a simplification, the plane connecting the center of ball 162 when the latter is in the position shown in FIG. 5 and the respective diametrically opposite position is generally parallel to the plane of upper surface 136a of base 136. Thus, the position of ball 162 in this respective plane is used to determine the center of the radius of curvature of arcuate slot sections 176 and 178. It will be appreciated that when ball 162 is arranged in either of these two positions, arm 160 is also arranged in such plane, and is parallel to the plane of upper surface 136a in which arcuate slot 174 is arranged.

A vertical column 180 is connected at one end to cylinder 112, preferably adjacent ports 118 and 120, as shown, and is connected at the opposite end thereof to a swivel plate 182 having end supports 184 and 186 which support swivel plate 182, vertical column 180 and cylinder 112 above base 136. A guide pin 188 extends from column 180, through swivel plate 182 into arcuate slot 174. It will be appreciated that guide pin 188 can alternatively be formed integrally with swivel plate 182, extending downwardly therefrom into arcuate slot 174. A pivot pin 190 is formed integrally with swivel plate 182 and extends downwardly therefrom into elongated slot 172. A spring (not shown) or other like means may be provided for normally biassing swivel plate 182 to the left in FIGS. 5 and 6 to prevent excessive free play in the pivotal movement of swivel plate 182 with respect to base 136.

With this arrangement, regardless of the angle at which piston 128 and cylinder 112 are pivoted with respect to center line 164 of the drive shaft of the drive motor, piston 128 will always assume the position shown in FIG. 3A in its extended position. As a result, the top or proximal end of the recessed section (not shown) of piston 128 will always be positioned in the working chamber of cylinder 112, which is bounded by working end 114 and ports 118 and 120, and no pocket 70 will be formed in such position. Thus, any gas bubbles formed between the recessed section and the inner wall of cylinder 112 will exit through the outlet port, and will not remain in cylinder 112, when piston 128 moves to its extended position.

Preferably, as shown in FIG. 5, swivel plate 182 has a configuration in which it converges to a point 192 past the working end 114 of cylinder 112. In this manner, point 192 is associated with a scale 194 on upper surface 136a of base 136 for determining the pivoting angle of piston 128 with respect to center line 164. In operation, the maximum pump flow can be taken at +20 degrees and −20 degrees.

Figure 7:
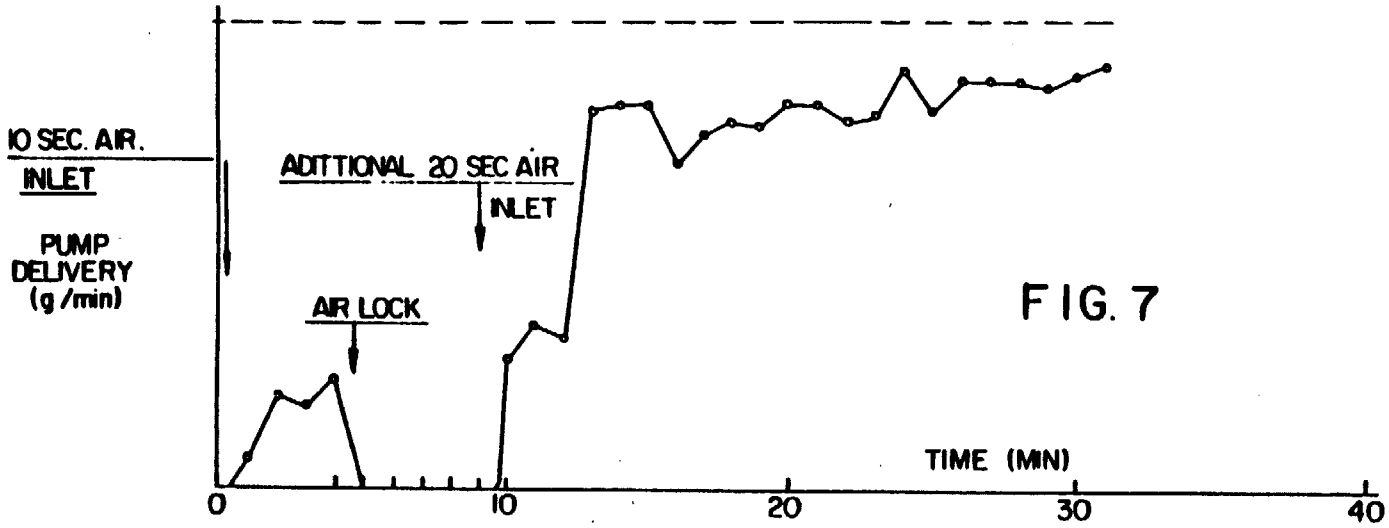
FIG. 7 is a graphical diagram showing the results of air entry in a conventional positive displacement piston pump.

With the present invention, positive displacement piston pump 110 is effectively insensitive to gases at lower than maximum capacity, since any gases are always removed. This is clearly seen in FIGS. 7 and 8. FIG. 7 shows the effect of air entry on conventional positive displacement piston pump 10 of FIGS. 1 and 2 having a one-quarter inch piston 28, rotating at 16.7 r.p.m., having a 20 cm suction and working against a 2 bar delivery pressure. Pump 10, when deaerated, delivers 0.79 grams of liquid per minute, and was operated at 15.8% of maximum capacity. Air was first introduced into the pump for 10 seconds. After 4 minutes of operation, the delivery of pump 10 was 0.24 grams per minute, and the pump then air locked at 5 minutes. On further admission of air, pump 10 was able to pass through a critical point and resume pumping. After approximately 30 minutes, pump 10 was pumping at approximately 89% of its set capacity. With a pump setting at 8.6% (0.43 ml/min) of maximum capacity or lower, it was found that the air lock would occur on entry of air, and the pump would not operate at all.

Figure 8:
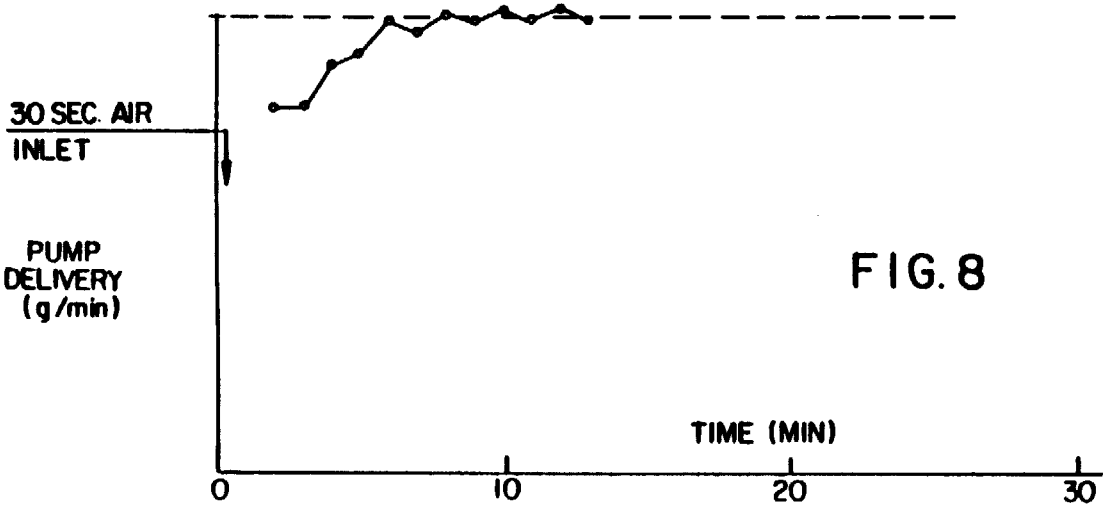
FIG. 8 is a graphical diagram showing the results of air entry in a positive displacement piston pump according to the present invention.

FIG. 8 shows the effect of air entry on positive displacement piston pump 110 of FIGS. 5 and 6 according to the present invention. Pump 110 had a one-quarter inch piston 128, rotated at 16.7 r.p.m., and a 20 cm suction and worked against a 2 bar delivery pressure. Pump 110 was operated at 15.2% of maximum capacity. Air was admitted to pump 110 for 30 seconds. Pump 110 reached 89% of its set capacity after 4 minutes.

In another test, a positive displacement piston pump according to FIGS. 1 and 2 was constructed, and the same pump was also constructed, but modified in accordance with the embodiment of the present invention as shown in FIGS. 5 and 6. Using water with some detergent (in order to obtain a low surface tension), the pumps were tested at 20 cm suction and 2 bar delivery pressure. A 250 ml beaker was placed on a weighing scale with 10 mg resolution and water was sucked out by the pumps. The weight was measured each minute. At a setting of 25% of maximum capacity, and after 20 seconds of air suction, the following results were obtained:

TABLE I

| Conventional Pump Set At 0.79 g/min Displacement After Careful Deaeration | |
|---|---|
| Time (min.) | Pumping Action (g/min) |
| 0-5 | 0.51 |
| 5-10 | 0.61 |
| 10-15 | 0.65 |
| 15-20 | 0.68 |
| 20-22 | 0.71 |
| 25-30 | 0.72 |
| After 30 | 0.72 |

TABLE II

| Present Invention Pump Set At 0.92 g/min Displacement After Careful Deaeration | |
|---|---|
| Time (min.) | Pumping Action (g/min) |
| 0-5 | 0.81 |
| 5-10 | 0.91 |
| 10-15 | 0.92 |
| After 15 | 0.92 |

TABLE III

| Present Invention Pump Set At 0.76 g/min Displacement After Careful Deaeration | |
|---|---|
| Time (min.) | Pumping Action (g/min) |
| 0-5 | 0.69 |
| 5-10 | 0.76 |
| After 10 | 0.76 |

As will be appreciated from the above results, air entrance tends to drop the pump capacity, and the conventional pump requires a much longer time to recover. This is because the small amount of air remaining in the cylinder must dissolve in the liquid before the pump reaches its full capacity. At settings lower than that shown in Table I, a gas bubble will cause the pump to completely stop delivery. On the other hand, a pump according to the present invention recovers very quickly from the introduction of air, and is practically air insensitive.

Figure 9:
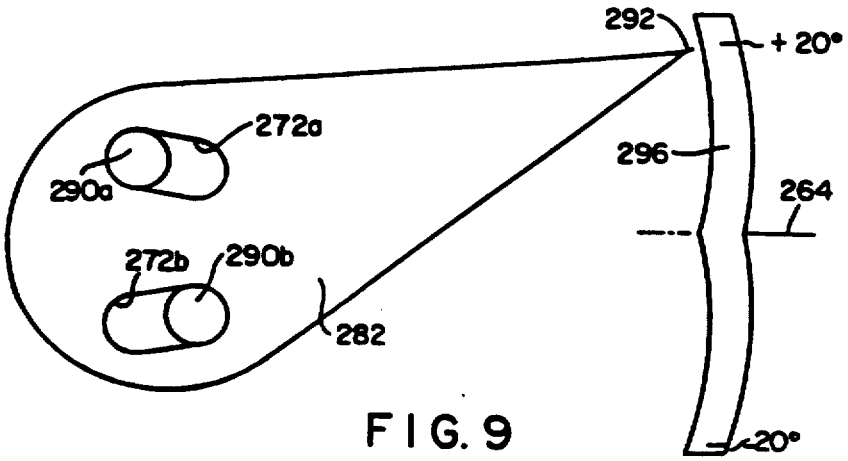
FIG. 9 is a top plan view of swivel plate of a positive displacement piston pump according to a second embodiment of the present invention.

Referring now to FIG. 9, a swivel plate 282 according to a second embodiment of the present invention will now be described. As shown, elongated slot 172 is replaced with two elongated, slightly arcuate slots 272a and 272b which are elongated in the general direction of center line 264 and are positioned on opposite sides thereof. In this regard, pivot pin 190 is replaced with two pivot pins 290a and 290b which fit within respective slots 272a and 272b. With this arrangement, a change in the angle from maximum capacity at, for example, 20 degrees, to 0 degrees in line with center line 264, is made with pivot pin 290a as the pivot center. A further change to −20 degrees is made with pivot pin 290b as the pivot center. Generally, the distance between pivot pins 290a and 290b is approximately equal to the diameter of the circle travelled by the center of ball 162 during each revolution. As an alternative to, or in addition to a spring for biassing swivel plate 282 to the left in FIG. 9, a ridge 296 may be positioned on the base, ahead of the point 292 of swivel plate 282 and, after pivotal adjustment, swivel plate 282 can be fixed in position by a screw clamp or the like (not shown).

It will be appreciated that various modifications within the scope of the present invention may be made by one of ordinary skill in the art. For example, the cylinder could be held in position and the drive motor and its drive shaft could be pivoted with respect thereto. Alternatively, the pins could be fixed to the base, and the swivel plate provided with the slots.

Having described specific preferred embodiments of the invention with reference to the accompanying drawings, it is to be appreciated that the present invention is not limited to those preferred embodiments, and that various changes and modifications may be effected therein by one of ordinary skill in the art without departing from the scope and spirit of the invention as defined by the appended claims.

GLOSSARY

| Reference Number | Description |
|---|---|
| 10 | positive displacement piston pump |
| 12 | hollow cylinder |
| 14 | closed working end |
| 15 | opposite end |
| 16 | bore |
| 18 | port |
| 20 | port |
| 22 | tubing |
| 24 | tubing |
| 26 | working chamber |
| 28 | piston |
| 30 | free end |
| 32 | driven end |
| 34 | recessed section |
| 34a | top or proximal end |
| 36 | base |
| 38 | L-shaped bracket |
| 40 | leg |
| 42 | pivot pin |
| 44 | leg |
| 46 | bore |
| 48 | drive motor |
| 50 | drive shaft |
| 52 | motor bracket |
| 54 | collar or yoke |
| 55 | reduced boss |
| 56 | pin |
| 58 | socket |
| 60 | laterally projecting or transverse arm |
| 62 | ball or spherical bearing |

-continued

GLOSSARY

| Reference Number | Description |
|---|---|
| 64 | axis or center line |
| 66 | retracted position |
| 68 | extended position |
| 70 | pocket |
| 110 | positive displacement piston pump |
| 112 | hollow cylinder |
| 114 | closed working end |
| 115 | opposite end |
| 116 | bore |
| 118 | port |
| 120 | port |
| 122 | tubing |
| 124 | tubing |
| 128 | piston |
| 132 | driven end |
| 136 | base |
| 150 | drive shaft |
| 154 | collar or yoke |
| 155 | reduced boss |
| 156 | pin |
| 158 | socket |
| 160 | laterally projecting or transverse arm |
| 162 | ball or spherical bearing |
| 164 | axis or center line |
| 172 | elongated slot |
| 174 | arcuate slot |
| 176 | arcuate slot section |
| 178 | arcuate slot section |
| 180 | vertical column |
| 182 | swivel plate |
| 184 | end support |
| 186 | end support |
| 188 | guide pin |
| 190 | pivot pin |
| 192 | point |
| 194 | scale |
| 264 | center line |
| 272a | elongated slot |
| 272b | elongated slot |
| 282 | swivel plate |
| 290a | pivot pin |
| 290b | pivot pin |
| 292 | point |
| 296 | ridge |

What is claimed is:

[1. A pump comprising:

a cylinder including a working end, an inlet port, an outlet port and a working chamber bounded by said outlet port and said working end;

a piston rotatably and reciprocably movable in said cylinder between a retracted position and an extended position, said piston including a free end having a recessed section alternately in fluid communication with said inlet port and said outlet port;

means for pivotally connecting said piston to drive means which rotatably and reciprocably drives said piston in said cylinder; and means for ensuring that said recessed section is positioned entirely in said working chamber when said piston is in said extended position, regardless of the angle between said piston and said drive means.]

[2. A pump according to claim 1; wherein said means for ensuring includes guide means for guiding said cylinder during pivotal movement of said piston with respect to said drive means to ensure that said recessed section is positioned entirely in said working chamber when said piston is in said extended position.]

[3. A pump according to claim 2; wherein said means for guiding includes base means having an arcuate slot with a radius of curvature generally transverse to said piston and at least one elongated slot extending in a direction generally transverse to said arcuate slot, and pin means for guiding said cylinder in said arcuate slot and said at least one elongated slot during pivotal movement of said piston with respect to said drive means.]

4. A pump according to claim [3] *11;* wherein said means for ensuring includes swivel plate means for connecting said pin means to said cylinder.

5. A pump according to claim [3] *11;* wherein said piston includes a driven end opposite to said free end; and said means for pivotally connecting includes yoke means connected to said drive means and having a socket therein, arm means extending generally transverse from said driven end of said piston and a ball mounted on said arm means and mating with said socket in a ball and socket arrangement.

6. A pump according to claim 5; wherein the arcuate slot is formed in a first plane of said base means, and the radius of curvature of said arcuate slot is centered substantially at the center of said ball when said arm means extends in a plane substantially parallel to the first plane of said base means.

7. A pump according to claim 5; wherein said radius of curvature is formed on opposite sides of a center line and in a first plane of said base means, the radius of curvature of said arcuate slot on one side of said center line is centered substantially at the center of said ball when said arm means extends in a first direction in a plane substantially parallel with the first plane of said base means, and the radius of curvature of said arcuate slot on the opposite side of said center line is centered substantially at the center of said ball when said arm means extends in a second, opposite direction in said plane.

8. A pump according to claim [3] *11;* wherein said pin means includes a guide pin slidably positioned in said arcuate slot, at least one elongated slot and means for connecting said guide pin and said at least one pivot pin to said cylinder.

[9. A pump according to claim 1; wherein said piston includes a driven end opposite to said free end; and said means for pivotally connecting includes yoke means connected to said drive means and having a socket therein, arm means extending generally transverse from said driven end of said piston and a ball mounted on said arm means and mating with said socket in a ball and socket arrangement.]

[10. A pump according to claim 2; wherein said guide means includes base means; swivel plate means mounted on said base means for supporting said cylinder; two elongated slots on one of said base means and said swivel plate means, and extending on opposite sides of and in the general direction of a center line of said pump; and two pin means on the other of said base means and said swivel plate means and extending in said two slots, respectively, for guiding said cylinder during pivotal movement of said piston with respect to said drive mens to ensure that said recessed section is positioned entirely in said working chamber when said piston is in said extended position.]

*11. A pump comprising:*

*a cylinder including a working end, an inlet port, an outlet port and a working chamber bounded by said outlet port and said working end;*

*a piston rotatably and reciprocably movable in said cylinder between a retracted position and an extended position, said piston including a free end having a recessed section alternately in fluid communication with said inlet port and said outlet port;*

*means for pivotally connecting said piston to drive means which rotatably and reciprocably drives said piston in said cylinder; and means for ensuring that said recessed section is positioned entirely in said working chamber when said piston is in said extended position, regardless of the angle between said piston and said drive means, said means for ensuring including guide means for guiding said cylinder during pivotal movement of said piston with respect to said drive means to ensure that said recessed section is positioned entirely in said working chamber when said piston is in said extended position, said means for guiding including base means having an arcuate slot with a radius of curvature generally transverse to said piston and at least one elongated slot extending in a direction generally transverse to said arcuate slot, and pin means for guiding said cylinder in said arcuate slot and said at least one elongated slot during pivotal movement of said piston with respect to said drive means.*

* * * * *